Patented Dec. 31, 1946

2,413,654

UNITED STATES PATENT OFFICE 2,413,654

EXTRACTION OF RUBBER FROM PLANTS OF THE GENUS CRYPTOSTEGIA

Ernest Otto Reif and Mark Trafton, Jr., La Lima, Honduras, assignors to United Fruit Company, Boston, Mass., a corporation of New Jersey No Drawing. Application October 30, 1944, Serial No. 561,164

2 Claims. (Cl. 260—814)

This invention relates to the processing of rubber-bearing plants to extract rubber therefrom and is concerned with an extraction process particularly applicable to plant growth of *Cryptostegia grandiflora*, although it is equally applicable to other rubber-bearing Cryptostegia species and hybrids.

Since *Cryptostegia grandiflora* and other rubber-bearing Cryptostegia plants contain at best only a small percentage of rubber, it is a main object of this invention to provide a process which will extract with economy and dispatch substantially all of the rubber contained in the plant material to be processed.

The extraction process of this invention involves a treatment of harvested growth as distinguished from extraction by field tapping of the growing plant.

The value of the process of this invention is founded upon its favorable yield but this yield varies according to the particular characteristics of the harvest processed. Most favorable yields are secured from harvests which comprise young, tender, green material which is not woody, such as that which is obtained by cutting back one-year-old *Cryptostegia grandiflora* plants to a point from one to three feet from the ground and allowing subsequent shoots to develop for a period of from six to eight weeks under dry, hot climatic conditions. Such tender non-woody green material is hereinafter referred to as "whip growth." The optimum harvest for the purposes of this invention from the standpoint of yield per acre of planting is that obtained by cutting the plants when maximum green whip growth has been attained.

In accordance with this invention such harvested whip growth is processed to bleed the contained latex therefrom into a form which permits its physical separation from the spent, bled material. For this purpose the latex is coagulated as it is bled from the growth and the difference in specific gravity between the coagulated rubber particles and the spent, bled growth permits their ready separation.

After separation of the rubber coagulum, it may be washed to free it of adherent non-rubber matter and then dried.

A typical extraction treatment is as follows:

Freshly harvested whip growth as above defined is chopped into short sections as in an ensilage chopper. It has been found that latex will flow from cut whip growth of *Cryptostegia grandiflora* for only a relatively short distance back into the shoots. It is therefore advisable to chop the growth into sections not exceeding three inches in length and preferably only one inch in length or shorter. Immediately following chopping, the sections are thrown into a hot acid bath, as hereinafter described, where they are subjected to mechanical agitation for a limited period of time.

The character of the bath is such that it has a pH of about 6.5, i. e., within the range of 6.4 to 6.8. Such pH value may be attained by the addition of tap water of proper amounts of any organic or weak inorganic acid. In the case of tap water having a normal pH of about 7.5 satisfactorily reduced pH can be attained by the addition of 0.01% or more by weight of sodium bisulphite. Sodium bisulphite is an especially desirable acid corrective because it acts with a dual function as a result of its favorable anti-oxidant properties.

The precise temperature of the bath may vary but should, at the time of the addition of the material to be processed, exceed 140° F. and preferably should be in the range of 200–210° F., for instance 203° F.

Best results have been obtained when the amount of charge added to the bath is in the proportion of about one pound of sectioned whip growth to one gallon of bath. A convenient batch treatment thus may involve the processing of 200 pounds of plant material in 200 gallons of hot water containing approximately two ounces of sodium bisulphite. The treatment may be conveniently carried out in a 600 gallon tank of about 2¾ feet in diameter provided with suitable steam coils for maintaining the proper temperature of the bath.

Suitable agitation may be accomplished by the provision in the tank of a four-bladed agitator slightly less than 2½ feet in diameter revolving, in a horizontal plane spaced medially of the height of the tank, between stationary baffles extending from the walls of the tank.

Satisfactory bleeding of such a 200 pound charge of plant material without acid damage to the extracted rubber has been accomplished by agitating the charge in the bath for a period of about 15 minutes with the agitator operating at 50 R. P. M. With more violent agitation the period of treatment may be reduced; if the agitator speed is 100 R. P. M. the time can be reduced by almost one-half. By the end of the agitation period, most of the plant material has bled its latex which coagulates in the acid bath. The spent bled material has either already collected near the bottom of the tank or will quickly settle. The remaining floating material—twigs, leaves and rubber coagulum—is then skimmed from the bath with a strainer and placed in a smaller tank where it is again agitated for from one hour and fifteen minutes to one hour and thirty minutes in room temperature (80° to 85° F.) tap water. Upon cessation of agitation, separation again takes place and the floating material comprises, substantially entirely, coagulated rubber particles which may be screened off. If particles of plant material, fiber, or dirt still remain adherent to the rubber particles, a repeated agitation of the screened material in a clean water bath for thirty minutes will complete the washing process. After screening from the third bath the rubber is pressed into bales or bricks and then dried.

In the case of the acid bath, it is not essential that the spent material at the bottom of the tank be removed after the screening, but it can remain for re-agitation with a succeeding charge or charges. Ordinarily the spent material is removed from the acid tank after the processing of three charges, the acid bath being drained off and the spent material being flushed out, readying the tank for return of the bath and addition of a new batch of sectioned growth.

On the other hand, settled spent material from the cold water baths is generally removed after each charge.

A typical yield by the above treatment of 200 pound charges has been found to be about 180 grams of rubber or .2% by weight of the charge, though it may be considerably more or less depending upon the age and condition of the material of the charge. The range so far achieved includes yields as high as .9% although in some cases the yield has not exceeded .1%.

All the equipment used in the treatment should be free of copper, brass, and iron.

A desirable feature of this process is that the resulting coagulum contains noticeably less acetone soluble matter than rubber obtained by coagulating whole fresh latex by means of acetone, alcohol, acids, etc. Apparently, a larger percentage of acetone soluble impurities are removed in our process because of the tendency of the hot acidified water to wash out water-soluble impurities before coagulation.

Experiments indicate that under proper conditions the above process results in substantially 100% removal of the latex from the plant material, thus indicating highly satisfactory yield in so far as the available latex is concerned. Furthermore, the process of this invention involves only about two hours total processing time.

We claim:

1. The method of extracting rubber from rubber-bearing plants of the genus Cryptostegia which includes the steps of chopping whip growth thereof into sections and agitating said sections in an aqueous sodium bisulphite solution having a pH of about 6.5 and at a temperature between 200 and 210° F. to bleed latex from the sections into coagulated rubber particles.

2. The method of extracting rubber from rubber-bearing plants of the genus Cryptostegia which includes the steps of chopping whip growth thereof into sections averaging less than three inches in length, agitating said sections in an aqueous acid bath having a pH of about 6.5 and at a temperature exceeding 200° F., to bleed latex from the sections into coagulated rubber particles and then removing the rubber coagulum from the bath.

ERNEST OTTO REIF.
MARK TRAFTON, JR.